(12) United States Patent
Kongkanand et al.

(10) Patent No.: US 8,735,023 B2
(45) Date of Patent: May 27, 2014

(54) FUEL CELL WITH LAYERED ELECTRODE

(75) Inventors: Anusorn Kongkanand, West Henrietta, NY (US); Eric L. Thompson, Livonia, NY (US); Frederick T. Wagner, Fairport, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 435 days.

(21) Appl. No.: 12/637,037

(22) Filed: Dec. 14, 2009

(65) Prior Publication Data

US 2011/0143254 A1 Jun. 16, 2011

(51) Int. Cl.
*H01M 8/10* (2006.01)
*H01M 4/86* (2006.01)
*H01M 4/92* (2006.01)

(52) U.S. Cl.
USPC ........... 429/532; 429/482; 429/483; 429/524; 429/525; 429/526; 429/527; 429/535

(58) Field of Classification Search
USPC ........... 429/483, 523, 532, 524, 482, 44, 480, 429/402, 525, 526, 527; 427/402; 106/31.92; 501/101
See application file for complete search history.

(56) References Cited

U.S. PATENT DOCUMENTS

| | | | |
|---|---|---|---|
| 6,723,464 B2 * | 4/2004 | Tabata et al. | 429/480 |
| 2003/0118890 A1 * | 6/2003 | Wittpahl et al. | 429/44 |
| 2004/0107869 A1 * | 6/2004 | Velamakanni et al. | 106/31.92 |
| 2005/0112451 A1 * | 5/2005 | Lee et al. | 429/44 |
| 2006/0240293 A1 * | 10/2006 | Kocha | 429/13 |
| 2007/0059452 A1 * | 3/2007 | Debe et al. | 427/402 |
| 2007/0060471 A1 * | 3/2007 | Zhou et al. | 502/101 |
| 2007/0231675 A1 * | 10/2007 | Son | 429/44 |
| 2008/0014495 A1 * | 1/2008 | Saito et al. | 429/44 |
| 2008/0038186 A1 * | 2/2008 | Lomax et al. | 423/600 |
| 2008/0124606 A1 * | 5/2008 | Lin et al. | 429/33 |

FOREIGN PATENT DOCUMENTS

| | | | | |
|---|---|---|---|---|
| CN | 1201554 A | 12/1998 | | |
| WO | WO-2007/119132 A | * 10/2007 | | H01M 8/10 |

OTHER PUBLICATIONS

Johnson Matthey Alfa Aesar Fuel Cell HiSPEC Catalyst Data Sheet, retrieved online on Mar. 31, 2012 from http://www.matthey.com.*
"NanoStructured Thin Film Catalysts (NSTFC)for Next Generation PEM Fuel Cells", Mark K. Debe, Northern Nano Workshop, University of Minnesota, Nov. 6, 2006. Retrieved online on Jul. 13, 2012 from: http://www.nano.umn.edu/northernnano/Northern_Nano_Talk_Nov06_Debe.pdf.*
"Fuel Cells Catalysts & Components", Johnson Matthey, Oct. 17, 2008, retrieved online on Oct. 23, 2012 from: http://www.alfa.com/en/docs/FuelCellBrochure.pdf.*
"Alfa Aesar releases fuel cell catalysts brochure", Laboratory Talk, Oct. 17, 2008, retrieved online on Oct. 23, 2012 from: http://www.laboratorytalk.com/alfa-aesar-releases-fuel-cell-catalysts-brochure/319919.article.*
Chinese Office Action dated May 28, 2013; Applicant: GM Global Technology Operations LLC.; Application:201010625067.6; 5 pages.

* cited by examiner

*Primary Examiner* — Kenneth Douyette
(74) *Attorney, Agent, or Firm* — BrooksGroup

(57) ABSTRACT

One embodiment includes at least one of the anode and cathode of a fuel cell comprises a first layer and a second layer in intimate contact with each other. Both the first layer and the second layer comprise a catalyst capable of catalyzing an electrochemical reaction of a reactant gas. The second layer has a higher porosity than the first layer. A membrane electrode assembly (MEA) based on the layered electrode configuration and a process of making a fuel cell are also described.

21 Claims, 3 Drawing Sheets

FUEL CELL WITH LAYERED ELECTRODE

TECHNICAL FIELD

The technical field generally relates to fuel cells, membrane electrode assemblies and fuel cell processes.

BACKGROUND

A fuel cell membrane electrode assembly typically includes a polymer electrolyte membrane sandwiched between an anode and a cathode. During fuel cell operation, a fuel gas, such as hydrogen, is oxidized on the anode while an oxidant gas, such as oxygen, is reduced on the cathode. The electrochemical redox reactions on the anode and cathode are generally catalyzed by a metal catalyst, such as platinum. Electricity can be generated from such electrochemical reactions in a fuel cell at a high efficiency. A thin single electrode layer is generally and desirably sought in fuel cells. A reactant gas (either the fuel gas or the oxidant gas) has a fast transport rate and minimal kinetic barrier to reach the reactive sites in a thin electrode layer, resulting in higher current density at a given cell voltage. A thin single electrode layer may also allow reduced usage of the costly platinum catalyst while achieving acceptable current density under certain operating conditions. Additionally, catalyst is typically distributed uniformly through the single layer electrode configuration to ensure uniform current distribution. Single layer electrode design is simple and generally less expensive to manufacture.

SUMMARY OF EXEMPLARY EMBODIMENTS OF THE INVENTION

One embodiment includes a membrane electrode assembly comprises a polymer electrolyte membrane sandwiched between an anode and a cathode. At least one of the anode and the cathode comprises a first layer and a second layer. The first layer comprises a metal-containing catalyst disposed on a plurality of organic support elements, and the second layer comprises a metal-containing catalyst disposed on a porous support material having a surface area of at least 30 m$^2$/g.

In another embodiment at least one of the anode and cathode of a fuel cell comprises a first layer and a second layer in intimate contact with each other. Both the first layer and the second layer comprise a catalyst capable of catalyzing an electrochemical reaction of a reactant gas. The second layer has a higher porosity than the first layer.

Another embodiment includes a process of producing a fuel cell or a membrane electrode assembly comprises: providing a polymer electrolyte membrane, forming a first electrode layer on at least one side of the membrane, where the first electrode layer comprises a catalyst disposed on a plurality of organic support elements; and depositing a second electrode layer over the first electrode layer, where the second electrode layer comprises a catalyst disposed on a porous support material.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

Figure 1:
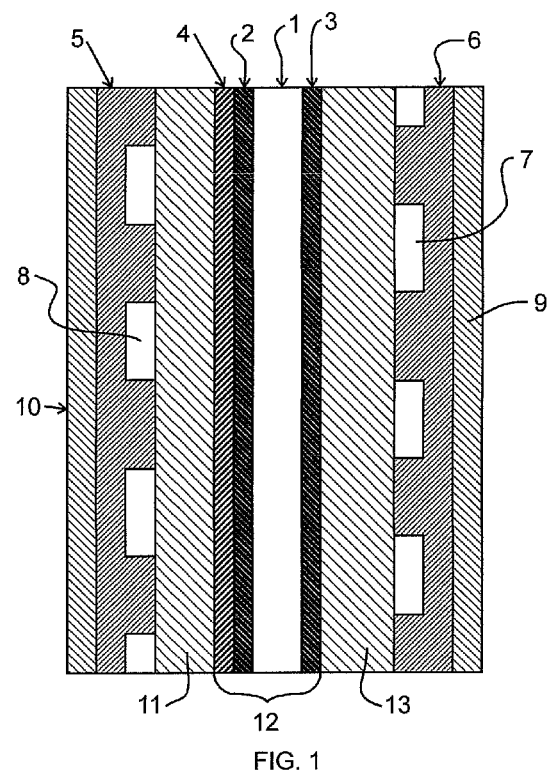
FIG. 1 is a schematic cross-sectional view of an exemplary fuel cell according to one embodiment of the invention.

The following description of the embodiment(s) is merely exemplary in nature and is in no way intended to limit the invention, its application, or uses.

One embodiment includes a fuel cell or a membrane electrode assembly including an electrode (i.e., an anode or a cathode) having at least a first electrode layer and a second electrode layer in intimate contact with each other. The second electrode layer generally has a higher porosity than the first layer. The membrane electrode assembly (MEA) is herein referred to as an assembled stack of at least an electrolyte membrane, a catalyst and an electrode used in fuel cells. The electrolyte membrane is typically sandwiched between an anode and a cathode, both of which comprise a support material and a catalyst for facilitating half-cell electrochemical reactions on the electrodes. In a hydrogen or direct methanol fuel cell, a proton conductive polymer electrolyte membrane (PEM) may be used in the membrane electrode assembly. The MEA can be used with other fuel cell components such as bipolar plates, gas diffusion layers, coolant plates, gaskets and end plates to form a fuel cell or a fuel cell stack having multiple cell units stacked together in series.

The first electrode layer may include a catalyst and a catalyst support material. The catalyst may include any catalyst that is capable of catalyzing half-cell hydrogen oxidation on a fuel cell anode and/or half-cell oxygen reduction reaction on a fuel cell cathode. The catalyst may include a noble metal, a transitional metal, metal oxide, metal alloy or mixtures thereof. The catalyst, for example, may comprise platinum, palladium, iridium, manganese, ruthenium, cobalt, nickel, iron, or any of their alloys. The catalyst may comprise a binary alloy or a ternary alloy. Non-limiting binary catalyst may include alloys represented by one of the chemical formulas: Pt$_x$Co$_y$, Pt$_x$Ru$_y$, Pr$_x$Mn$_y$, Pt$_x$Ni$_y$, Pt$_x$Ir$_y$, and Pt$_x$Fe$_y$, where x and y are real numbers between about 0.01 and 1. Non-limiting ternary catalyst may include alloys represented by a general formula: Pt(M1)$_x$(M2)$_y$, where M1 and M2 are transitional metal elements, x and y are real numbers between about 0.01 and 3. Examples of M1 and M2 include, but not limited to, Fe, Co, Mn, Ni, Ru, Pd, Ir or Cu. A ternary alloy comprising Pt, Mn and Co, with the ratio of Pt to combined Mn and Co ranged from 1:0.1 to 1:3 may be used in the first electrode layer. When Pt is included in the catalyst, the areal amount of platinum based on the active area of the electrode layer may range from 0.05 mg/cm$^2$ to about 0.4 mg/cm$^2$, or 0.1 mg/cm$^2$ to 0.4 mg/cm$^2$. The percentage of platinum based on the combined catalyst and support weight, may range from about 20% to 95%, 40% to 90% 60% to 90%, or 80% to 90%, depending on the type of catalyst support used and the thickness of the electrode layer. When a carbon black or other inorganic materials are used as the catalyst support, the weight percentage of Pt may range from 20% to about 60%. If an organic material is used as the catalyst support, Pt may be present at an amount greater than about 60% or 80% by weight. The organic support material may be present in a form of fine elements in any geometric shapes. Fine organic elements having an average particle size between about 1 nanometer to about 1000 nanometers may be used. The first electrode layer generally has a thickness less than about 5 microns, 3 microns, 1 micron or 0.5 micron. The first layer may be a so-called ultra-thin electrode layer having a thickness between about 0.1 micron and 1 micron. One example of such ultra-thin electrode layer is a nanostructured thin film (NSTF) as described in U.S. Pat. No. 6,136,412.

An NSTF electrode layer is typically formed by depositing a layer of nanostructured elements (typically in the shape of whiskers) of an organic or an inorganic material onto an initial microstructured support substrate. The nanostructured elements layer is subsequently transferred from the initial substrate onto a PEM (Polymer Electrolyte Membrane) to form an electrode layer. A catalyst, such as Pt, $Pt_xCO_y$ alloy and $PtMn_xCO_y$ alloy, may be deposited on the nanostructured elements by physical vapor deposition or other known deposition methods. Methods for making the initial organic nanostructured element layers are disclosed, for example, in *Materials Science and Engineering*, A158 (1992), pp. 1-6; *J. Vac. Sci. Technol. A*, 5, (4), July/August, 1987, pp. 1914-16; *J. Vac. Sci. Technol.* A, 6, (3), May/August, 1988, pp. 1907-11; *Thin Solid Films*, 186, 1990, pp. 327-47; *J. Mat. Sci.*, 25, 1990, pp. 5257-68; *Rapidly Quenched Metals, Proc. of the Fifth Int. Conf. on Rapidly Quenched Metals*, Wurzburg, Germany (Sep. 3-7, 1984), S. Steeb et al., eds., Elsevier Science Publishers B.V., New York, (1985), pp. 1117-24; *Photo. Sci. and Eng.*, 24, (4), July/August, 1980, pp. 211-16; and U.S. Pat. Nos. 4,568,598 and 4,340,276. Methods for making the initial inorganic-based nanostructured layers of whiskers are disclosed, for example, in *J. Vac. Sci. Tech.* A, 1, (3), July/September, 1983, pp. 1398-1402, K. Robbie, et al, "Fabrication of Thin Films with Highly Porous Microstructures," *J. Vac. Sci. Tech.* A, Vol. 13 No. 3, May/June 1995, pages 1032-35 and K. Robbie, et al., "First Thin Film Realization of Bianisotropic Medium," *J. Vac. Sci. Tech.* A, Vol. 13, No. 6, November/December 1995, pages 2991-93 and U.S. Pat. Nos. 3,969,545; 4,252,865; 4,396,643; 4,148,294; 4,252,843; 4,155,781; 4,209,008; and 5,138,220.

The nanostructured element may comprise a whisker (or a metal coated whisker) of an organic material such as a polynuclear aromatic hydrocarbon and a heterocyclic aromatic compound, most preferably C.I. (Color Index) PIGMENT RED 149 (perylene red or PR 149, available from American Hoechst Corp. of Somerset, N.J.). The crystalline whiskers have substantially uniform but not identical cross-sections, and high length-to-width ratios. The nanostructured whiskers are conformally coated with materials suitable for catalysis, and which endow the whiskers with a fine nanoscopic surface structure capable of acting as multiple catalytic sites. The length of each nanostructured element is in the range from about 0.01 to 20, 0.1 to 10, or 0.1 to 5 micrometers. The nanostructured elements are typically of uniform length. The average cross-sectional dimension of each nanostructured element is less than about 1 micrometer, preferably 0.01 to 0.5 micrometers. Most preferably, the average cross-sectional dimension of each microstructure is in the range from 0.03 to 0.3 micrometers. A layer of nanostructured elements typically may have an areal number density in the range from about $10^7$ to about $10^{11}$ elements per square centimeter. More preferably, the layer of nanostructured elements may have an areal density in the range from about $10^8$ to about $10^{10}$ nanostructured elements per square centimeter. Furthermore, the high surface area of the nanostructured elements allows more catalyst to be deposited on the surface. The catalyst may be present at least about 80% by weight based on the combined weight of nanostructured elements and the catalyst. In comparison, an electrode layer based on a carbon black supported platinum catalyst typically has a catalyst loading of most 40% based on the total weight of carbon and catalyst. Although the NSTF electrode layer has such a high catalyst weight percentage, the areal density of the catalyst amount, a measure directly related to overall catalyst amount for a unit size fuel cell, is only about 0.05 to 0.2 mg/cm$^2$.

The nanostructured elements layer is typically formed on an initial support substrate and easily transferable from the initial substrate onto a polymer electrolyte membrane or a gas diffusion layer to form an electrode layer. Any known transfer processes may be used. A hot press, in a batch process or a continuous process using nip rolls, belt, or compressing plates, may be used with or without pretreatment of the PEM or the initial substrate with heat, a solvent, adhesive, binder, or other auxiliary materials. A pressure between 90 and 900 MPa (mega-Pascal), or between 180 and 270 MPa may be used to press the initial substrate having a deposited nanostructured elements against a polymer electrolyte membrane or a gas diffusion layer. The press temperature is between 80° C. and 300° C., or between 100° C. and 150° C. The pressing time is typically greater than 1 second and preferably about one minute. The PEM and the initial substrate having the deposited nanostructured elements may be preheated for 1 to 10 minutes before being pressed together. The platens of the press may be water cooled or cooled by any other suitable means before the pressure is released and the initial substrate is removed. A press employing vacuum platens may optionally be used. The resulting NSTF electrode layer typically may have a thickness ranged from 0.1 to 3, 0.1 to 2, or 0.1 to 1 micrometer.

The second electrode layer generally comprises a porous support and a catalyst. The porous support may comprise a conglomerate or an aggregate of fine particles of inorganic or organic materials. Carbon black having a primary particle size between about 1 nm and 100 nm, for example, may be used as the support material. Primary particles of the support material may be allowed to loosely adhere to each other to form aggregates, and the aggregates allowed to form conglomerates. As a result, there are significant amount of voids and pores within the aggregated or conglomerate structures. The amount and size of the pores depend on the particle size and how the particles organize to form the aggregates. Support materials having high surface area generally provide desirable porous structure and performance characteristics in the fuel cell having the layered electrode configuration. A suitable support material may have a BET surface area greater than about 30 m$^2$/g, 250 m$^2$/g, 500 m$^2$/g, 1000 m$^2$/g or 1500 m$^2$/g. The support material may comprise, for example, carbon black, Shawinigan black, Ketjen black, graphite, doped metal oxides, metal or inorganic oxides, oxynitrides, carbon nanotube, graphitized carbon, inorganic hydroxides, or carbon black surface-modified with an organic hydrophilic group, reducible oxide, or interstitial compound. Specific treatments can be applied to the support material to increase or decrease the number of active centers available for deposition of a catalyst. Carbon blacks can be chemically modified to introduce functional groups that act as sites for platinum anchoring. Carbon black surface may also be chemically modified to include a hydrophilic organic group for enhanced hydrophilicity. For example, surface oxidation of carbon black at high temperatures in the presence of an acid can produce hydrophilic carboxylic acid group (—COOH or its salt) on the carbon surface. Reaction of carbon black with an aromatic sulfonic acid azide (pre-formed or formed in-situ) allows the attachment of a hydrophilic aromatic sulfonic acid group on the surface of carbon. The aromatic sulfonic acid azide may be represented by a general chemical formula, $X^-N^+_2$—Ar—$SO_3H$, where Ar is an aromatic radical (such as phenylene or nathpthalene radicals), X is an anion, and —$N^+_2$— is an azide group. One example of carbon black is Vulcan XC-72R (available from Cabot Corporation). The carbon black may also be modified by or combined with an oxide, hydroxide, metal oxynitride, and doped metal oxide. Non-limiting inorganic oxides, oxynitrides and hydroxides may include the oxides, oxynitrides and hydroxides of silicone, titanium, aluminum, magnesium, zirconium, ruthenium, zinc, niobium, tantalum, molybdenum, and tin. Various mixtures of oxides, oxynitrides and hydroxides may also be used. Furthermore, a hydrophilic polymer or a polymer electrolyte may be deposited on or attached to the support material surface to enhance the hydrophilicity of the second electrode layer.

The catalyst used in the second electrode layer may include any catalyst that is capable of catalyzing electrochemical half-cell reduction of oxygen or oxidization of hydrogen. A typical catalyst may comprise a metal such as platinum, ruthenium, iridium, palladium, cobalt, nickel and their alloys. The catalyst may be a single metal (such as Pt), binary metal (such as Pt/Co, Pt/Ru, Pt/Mn, and Pt/Ni), or ternary metal such as Pt/Co/Mn. The catalyst may be deposited on the porous support material through physical vapor deposition (PVD), chemical vapor deposition (CVD), chemical impregnation, physical mixing, solution redox deposition or other known deposition methods. In one example, Pt metal, Pt/Co or Pt/Ru alloy nano-particles are prepared in-situ and deposited on a support material surface by borohydride reduction of the corresponding metal salts such as $H_2PtCl_6$. Size control of the catalyst particles may be achieved through the use of a mesoporous carbon support such as Vulcan XC-72 and a capping agent (e.g. tetrabutylammoniumbromide). The catalyst particle may have a resulting particle size between about 1 nanometer to about 10 nanometers. The amount of catalyst used in the second electrode layer is generally less than in the first electrode layer. If Pt is used as the catalyst, areal loading of Pt may be less than about 0.1 mg/cm$^{2b}$, 0.05 mg/cm$^2$, or 0.02 mg/cm$^2$. Percentage of Pt loading based on the combined weight of support material and catalyst may be less than about 60%, 40%, 20% or 10% by weight. The thickness of the second electrode layer may be greater than that of the first electrode layer. The thickness of the second electrode layer may be greater than about 0.5 micron, 1 micron, 2 microns, or 5 microns.

Optionally, the second electrode layer may further comprise an ionomer and/or a polymer resin binder. The ionomer is herein referred to as a polymeric electrolyte having a mobile ionic species for providing ionic conductivity. A proton conducting ionomer, for example, is particularly useful in a hydrogen or direct methanol fuel cell where proton species is generated and conducted through the PEM membrane in normal operations. Exemplary ionomers include perfluorosulfonic acid polymers, tetrafluoroethylene-perfluoro-3,6-dioxa-4-methyl-7-octenesulfonic acid copolymer, NAFION® (available from DuPont), FLEMION® and ACIPLEX® (available from Asahi Glass Co. Ltd). Ionomers may be prepared by incorporating perfluorovinyl ether groups terminated with sulfonate groups onto a tetrafluoroethylene backbone. Several exemplary ionomers are described in U.S. Pat. Nos. 4,272,353 and 3,134,689, and in the Journal of Power Sources, Volume 28 (1990), pages 367-387. An ionomer may be characterized by its EW which is defined as the weight of ionomers per mole of sulfonic acid group. A suitable ionomer may have a EW value between about 400 and 1500. Other exemplary ionomers may include sulfonated polyperfluorocyclobutane ether polymers, as described in U.S. Pat. No. 6,559,237 and US patent application publication number 20070099054. Hydrocarbon based ionomers, such as poly (styrene sulfonic acid), sulfonated PPBP poly(4-phenoxylbenzoyl-1,4-phenylene), sulfoarylated PBI poly(benzylimidazole), and sulfonated PEEK (poly(ether ether ketone), may also be used. Different ionomers mentioned above may be combined and included in the second electrode layer. In addition to ionomer, a polymer resin binder, such as PTFE (polytetrafluoethylene), polyvinylidene fluoride, ethylene-tetrafluoethylene copolymer, vinylidene fluoride-hexafluoropropylene copolymer, perfluorinated polyethers, and polyolefins, may be incorporated into the second electrode layer. The ratio of ionomer to porous support material may range from 0.01 to 10, 0.1 to 5, or 0.1 to 2 by weight. To form the second electrode layer, for example, an inorganic support material such as carbon black (with or without deposited catalyst) is mixed with an ionomer solution or dispersion and optionally a dispersion of PTFE to form a mixture or paste. The mixture is then coated on the first electrode layer by spray coating, brushing, scrape coating, transfer coating, impregnation, dip coating, or other known layer-formation methods. The coating is subsequently dried at elevated temperature to drive off the solvent and optionally fuse or cure the ionomer and/or the binder, or to activate the adhesion to the first electrode layer.

The second electrode layer is preferably a dispersed catalyst layer, where the catalyst is dispersed throughout a porous support where it is exposed to the reactant gas in a fuel cell. As described above, a simple catalyst (such as Pt or mixture of Pt with at least a noble metal or a transition metal) may be impregnated into the porous support to yield dispersed nanoparticles, or a catalyst precursor is vacuum impregnated into the porous support to yield a connected catalyst network. Vacuum impregnation can be accomplished on a porous support structure with or without the presence of an ionomer.

The first and second electrode layers are typically in intimate contact with each other to form at least a part of an integrated electrode structure. The second layer is more porous than the first layer and permeable to the reactant gas used in the fuel cell. The porous and permeable second electrode layer typically allows at least some of the reactant gas to diffuse through the second layer to reach reaction sites in the first electrode layer. The first electrode layer may comprise an organic support material while the second electrode layer may comprise an inorganic support material. The first electrode layer may be free of carbon black. The first electrode layer may comprise a ternary catalyst, and the second electrode may comprise a single metal catalyst or binary metal catalyst. The second electrode layer may be generally thicker than the first electrode layer. The layered electrode configuration offers much improved fuel cell performance in durability, energy density, low/mid temperature performance, cold start, and water management. In one embodiment, the first electrode layer is a NSTF layer deposited on a PEM, and the second electrode layer is a dispersed catalyst layer deposited or coated on the first electrode layer. In another embodiment, the second electrode layer is deposited directly on a PEM and the first layer is laminated onto the second electrode layer. The fuel cell electrode may include additional first and/or second electrode layers or other electrode layers besides the first and the second electrode layers described above.

A membrane electrode assembly comprises a polymer electrolyte membrane having a first surface and a second surface. An anode is disposed on the first surface and a cathode is disposed on the second surface. At least the cathode comprises at least the first electrode layer and the second electrode layer in intimate contact with each other. In one embodiment, the anode is a single layer ultrathin electrode, and the cathode comprises a first ultrathin electrode layer and a second dispersed catalyst electrode layer. The ultrathin electrode layer may be a NSTF electrode layer as described above, and the dispersed catalyst electrode layer may comprise a carbon black as the support material and a Pt or Pt alloys as the dispersed catalyst. The NSTF electrode layer may be deposited or laminated directly onto the PEM and the dispersed catalyst layer is coated or laminated onto the NSTF electrode layer. In another embodiment, the dispersed catalyst layer may be coated onto a gas diffusion layer first, and the coated side of the gas diffusion layer is subsequently laminated to or brought in contact with the NSTF cathode layer under pressure.

The polymer electrolyte membrane may comprise any polyelectrolyte suitable for the fuel cell. The polymer electrolyte may include hydrocarbon- and fluorocarbon-based resins. Hydrocarbon-based electrolyte resins may include phenolic, sulfonic acid, sulfoamide, aromatic ketone, carboxylic acid containing resins; condensation resins such as phenol-formaldehyde, polystyrene, styrene-divinyl benzene copolymers, styrene-divinylbenzene-vinylchloride terpolymers, and the like. Fluorocarbon-based polymer electrolytes may include perfluorinated sulfonic acid polymers such as tetrafluoroethylene-perfluorosulfonyl ethoxyvinyl ether tetrafluoroethylene-hydroxylated (perfluoro vinyl ether) copolymers, and sulfonated perfluorocyclobutane copolymers. In certain cases, fluorocarbon-type resins having sulfonic, carboxylic, sulfoamide, sulfonylimide and/or phosphoric acid functionality are also used. Fluorocarbon-based resins typically exhibit excellent resistance to oxidation by oxygen, peroxide, strong acids and bases, and can be used in neat and composite electrolyte membranes where a reinforcing non-electrolyte material such as a PTFE (polytetrafluoroethylene) orientated porous film or fiber matrix is used as a mechanical framework. One family of fluorocarbon-type resins having sulfonic acid group functionality is the Nafion™. resins (DuPont Chemicals, Wilmington, Del., available from ElectroChem, Inc., Woburn, Mass., and Aldrich Chemical Co., Inc., Milwaukee, Wis.). Other fluorocarbon-based polymer electrolyte resins that can be useful in the invention comprise (co)polymers of olefins containing aryl perfluoroalkyl sulfonylimide cation-exchange groups. One such resin is p-STSI, an ion conductive material derived from free radical polymerization of styrenyl trifluoromethyl sulfonylimide (STSI) having the formula: styrenyl-$SO_2$—NH—$SO_2CF_3$. Polymer electrolyte having an equivalent weight (EW) of about 400 to about 1000 may be used to cast the electrolyte membrane in the fuel cell.

A polymer electrolyte membrane can be cast or otherwise formed from a composition comprising the polymer electrolyte. The polymer electrolyte composition in a form of solution, dispersion, emulsion, polymer melt, particles blend, or neat liquid blend may be used to prepare the membrane. Depending on the form and specific composition of the mixture, various membrane formation methods known to an ordinary skill may be used. Non-limiting exemplary membrane formation methods may include extrusion through a slot die, solution casting, fixed gap coating, spray casting, dip coating, draw-down rod coating, calendaring, brushing, impregnation of a reinforcing sheet material and blow molding.

A fuel cell may be constructed using the layered electrode and/or the membrane electrode assembly described above. Polymer electrolyte membrane fuel cells, hydrogen fuel cells, direct methanol fuel cells, and reformate fuel cells, for example, may be constructed using the layered electrode or the membrane electrode assembly. FIG. 1 is a schematic cross-sectional view of an exemplary fuel cell comprising a layered electrode and a membrane electrode assembly having a layered electrode as described above. As shown in FIG. 1, a membrane electrode assembly 12 is sandwich between a first gas diffusion layer 11 and a second gas diffusion layer 13. The membrane assembly comprises a PEM 1, sandwiched between an anode 3 and a cathode comprising a first cathode layer 2 and a second cathode layer 4. The second cathode layer 4 is more porous than the first cathode layer 2. The first cathode layer 2 and the anode layer 3 may each be an ultrathin electrode such as a NSTF electrode layer. The second cathode layer 4 may be a dispersed catalyst layer as described above. Gas flow distributor layers 5 and 6 having corresponding gas flow channels 8 and 7 overlie the gas diffusion layers. Optionally, coolant plates 9 and 10 are disposed over the gas flow distributor layers to provide a means for temperature control. Any known gas flow distributors and coolant plates may be adopted to use in the fuel cell. Gas flow distributor plates based on graphite, carbon composites, carbon fiber composites, stainless steel plate, titanium plate, aluminum alloy plate, and gold plated metal plates, for example, may be used.

The gas diffusion layers 11 and 13 may comprise an electrically conductive porous matrix and an optional microporous layer. The electrically conductive porous matrix, may include, for example, a porous conductive foam (such as carbon foam, metal foam, . . . etc.), conductive fiber matrix, or a conductive particle aggregate porous layer. A carbon fiber matrix may include at least one of a carbon paper, carbon fiber nonwoven sheet, carbon fiber woven cloth, and carbon fiber knitted cloth. Commercial carbon cloth and paper materials are available from Zoltek, SGL group (with trade name Sigracet®) and Toray. An optional microporous layer may be interposed between the first porous matrix layer 11 and the second cathode electrode layer 4. The microporous layer may comprise an electrically conductive particle, a hydrophobic agent and optionally a polymer electrolyte. The microporous layer may provide proper pore sizes for gas permeation, water management and enhancement of intimate electric contact with neighboring catalyst electrode layer. The electrically conductive particle may include carbon particles and any other conductive inert materials such as noble/transitional metals and their oxides. Carbon particles may include Vulcan carbon (such as Vulcan XC-72), acetylene black, carbon nanotube, graphite, Black Pearls 2000, and Ketjen Black. The hydrophobic agent may include, but not limited to, polymers and copolymer of vinylidene fluoride, tetrafluoroethylene, ethylene, propylene, and hexafluoropropylene. A solution or dispersion of polyvinylidenefluoride (PVDF), polytetrafluoroethylene (PTFE), or poly(tetrafluoroethylene-co-ethylene), for examples, may be used as the hydrophobic agent.

Figure 2:
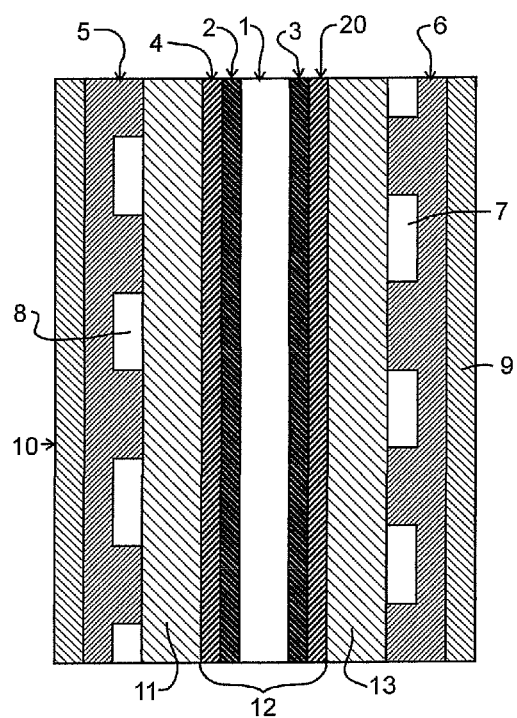
FIG. 2 is a schematic cross-sectional view of another exemplary fuel cell according to another embodiment of the invention.

FIG. 2 is a schematic cross-sectional view of another exemplary fuel cell according to one embodiment of the invention. In this particular example, the fuel cell and the membrane electrode assembly 21 include dual cathode layers 2 and 4, and dual anode layers 3 and 20. One of anode layers 3 and 20 is an ultrathin electrode layer and the other is a dispersed catalyst layer. The second anode layer 20 has a higher porosity than anode layer 3.

The layered electrode described above affords much improved fuel cell and membrane electrode assembly performance, especially under low and mid temperature operating conditions (e.g., 0°-60° C.), cold start, high humidity and high current density conditions. The high porosity and high surface area of the support material in the second electrode layer provide hydrophilicity and excellent water management while synergistically enhancing the other desirable properties of the first electrode layer, especially when the first electrode layer is an ultrathin electrode layer such as a NSTF layer. The amount of catalyst used in the second electrode layer is typically so small that it has a minimal impact on the total catalyst usage in a fuel cell. The small amount of catalyst in the second layer, however, provides synergistic and disproportional improvement in fuel cell performance. Although not bound to or by any particular theory, it is believed that the small amount of catalyst in the second electrode layer enables heat production from the catalyzed electrochemical reaction, thus accelerating the water evaporation and contributing to the fuel cell electricity generation at the same time. The second electrode layer also interact synergistically with the first electrode layer to wick away liquid water produced at the first electrode layer, to protect the first electrode layer from overloading, to increase the electrode robustness, to extend the fuel cell life and to enhance electricity conduction.

EXAMPLES

A fuel cell similar to what shown in FIG. 1 is constructed using a perfluorinated sulfonic acid polymer membrane having a NSTF electrode layer laminated on each side of the membrane. A ternary catalyst, Pt/Mn/Co is used on both the anode and the cathode. Platinum loading is about 0.1 mg/cm$^2$ on the anode, and 0.15 mg/cm$^2$ on the cathode. The NSTF electrode layers have a thickness of about 0.1-0.6 micron.

At 80° C., the fuel cell is operated under constant stoichiometry of 2 on both the cathode and anode sides. Stoichiometry herein refers to the ratio of the amount of reactant gas actually supplied to the amount of gas needed to complete the electrochemical reactions. The polarization curve is obtained by acquiring cell voltage and current density data under current control operating mode. At temperatures between 30° C. and 60° C., the fuel cell is operated under constant hydrogen flow rate of about 0.8 slpm (standard liter per minute) on the anode side and constant oxygen air flow rate of 1.8 slpm on the cathode side. The cell voltage-current density data for a polarization curve are obtained using potential control operating mode. HFR (membrane high frequency resistance, Ohm-cm$^2$) is also measured and provided on the same graph along with the polarization curves. HFR is generally a direct measurement of membrane hydration level, and can be obtained by AC impedance measurement. The relative humidity on the hydrogen gas side is controlled at about 100% while the relative humidity on the cathode side is about 50%. The pressure of supplied reactant gases is about 150 kPa (kilopascal) on both anode and cathode sides.

Figure 3:
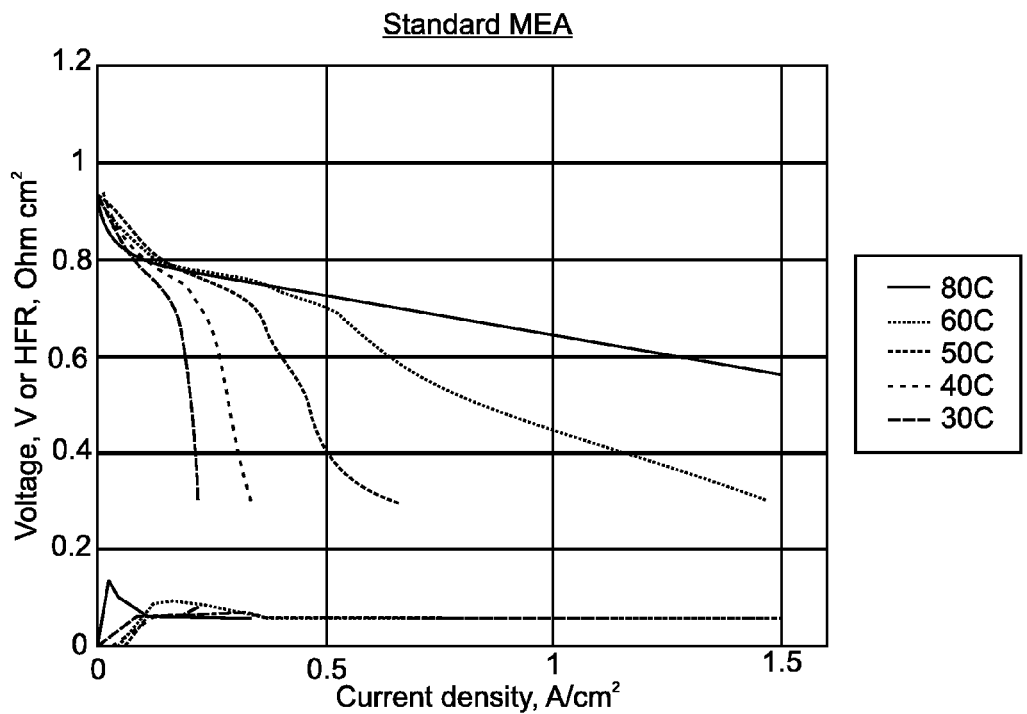
FIG. 3 is a graph showing a plurality of polarization curves of a fuel cell having a single layer ultrathin cathode.

In a comparative example, FIG. 3 shows a plurality of polarization curves obtained from a fuel cell having a single layer ultrathin cathode design (NSTF electrode layer) at 5 different operating temperatures. No second electrode layer is coated on the NSTF layer. As evident in the graph of FIG. 3, the polarization curves and fuel cell current density drop dramatically when the operating temperature drops from 80° C. to 60° C., 50° C., 40° C. and 30° C. The NSTF ultrathin electrode layer has very limited porosity and pore volume. At mid and low operating temperatures (0°-50° C.), water produced on the cathode can not be evaporated effectively, resulting in the formation of a liquid water layer over the cathode surface. The water layer blocks the reactant gas from reaching some of the catalyst surface for electrochemical reaction, thus reducing the rate of electrochemical reactions and current density.

Figure 4:
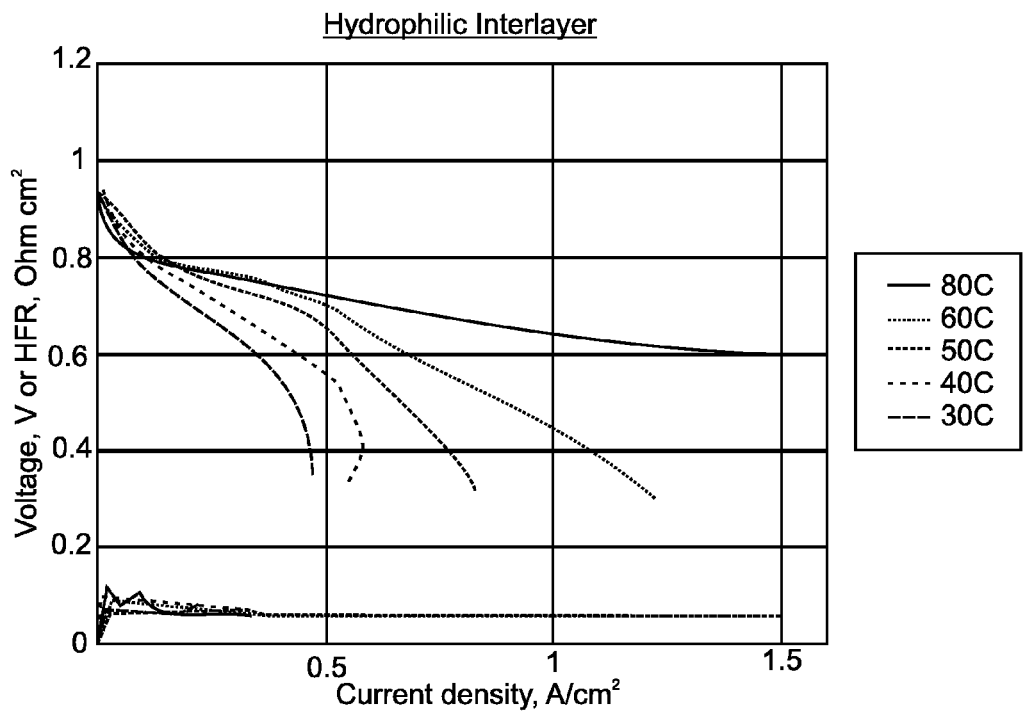
FIG. 4 is a graph showing a plurality of polarization curves of a fuel cell having an ultrathin single layer cathode coated with a porous support material without a catalyst.

In another comparative example, FIG. 4 shows several polarization curves obtained from a fuel cell having a single layer ultrathin cathode design (NSTF electrode layer) at 5 different operating temperatures. In this example, a porous support material layer comprised of graphitized Vulcan carbon (XC-72) without any catalyst is coated on the cathode layer. Graphitized Vulcan particles are first mixed with an ionomer solution at an ionomer to carbon ratio of about 0.1:1 The mixture is then coated on the NSTF cathode layer by any of the previously mentioned methods such as spray, bar, or slot die method. The coating is dried at an elevated temperature and the resulting porous support layer is about 3 microns thick. The polarization curves and fuel cell current density drop significantly, but less dramatically when the operating temperature drops from 80° C. to 60° C., 50° C., 40° C. and 30° C. The improvement over first comparative example is attributed to improved water management due to porous support material layer disposed over the NSTF cathode.

Figure 5:
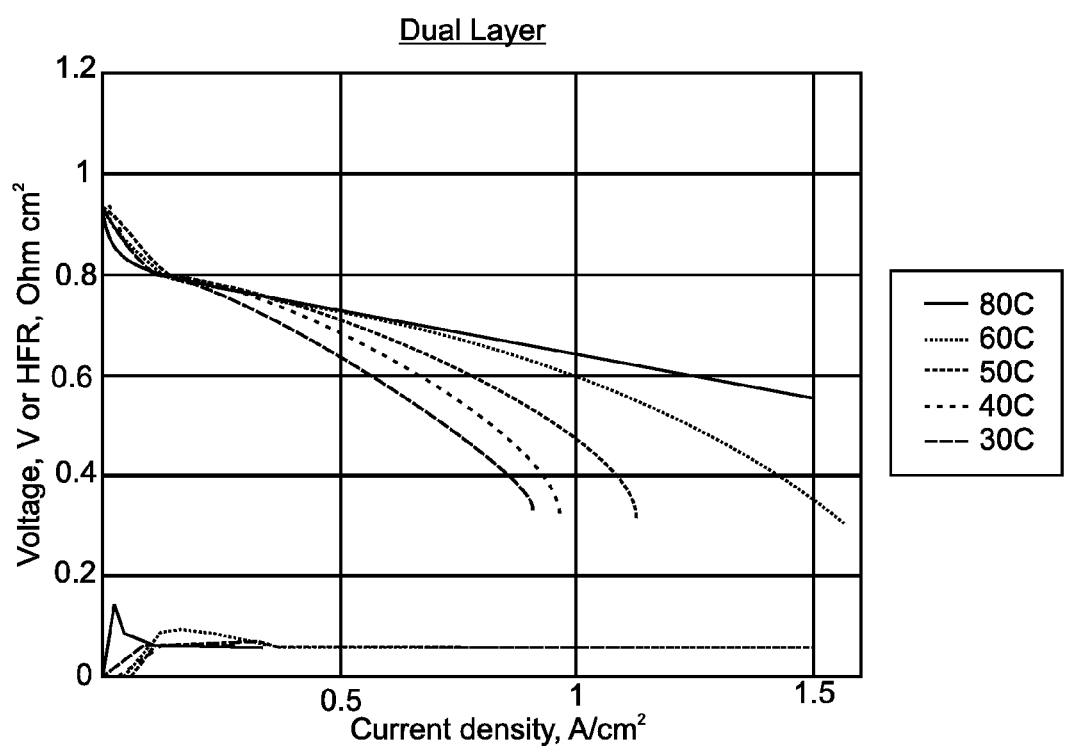
FIG. 5 is a graph showing a plurality of polarization curves of an exemplary fuel cell having an ultrathin first electrode layer and a porous second electrode layer.

FIG. 5 shows several polarization curves obtained under similar conditions from a fuel cell having a NSTF ultrathin first cathode layer and a porous disperse catalyst as the second cathode layer. The dispersed catalyst second layer is deposited on the NSTF cathode layer by a spray or bar coating method. The dispersed catalyst cathode layer is prepared by first mixing a Vulcan carbon or graphitized Vulcan support material having about 20 wt % PT loaded on the support material with an ionomer solution such as Nation, water, surfactants, and an organic solvent. The ratio of ionomer to carbon by weight is about 0.2:1. The mixture is subsequently coated on NSTF first cathode layer using spray, bar, or slot die method. The coating is dried at elevated temperature of about 70° C. to remove solvent. The resulting dispersed catalyst electrode layer has a thickness about 1 micron and a Pt catalyst amount of merely 0.01 mg/cm$^2$. As shown in Figure 5 the polarization curves and the fuel cell density drop much less when the operating temperature drops from 80° C. to 60°, 50°, 40° and 30° C. Such significant improvement with minimal amount of catalyst is attributed to further improvement in water management by the porous second layer and the synergistic combination of the two different cathode layers.

The above description of embodiments of the invention is merely exemplary in nature and, thus, variations thereof are not to be regarded as a departure from the spirit and scope of the invention.

What is claimed is:

1. A membrane electrode assembly comprising a polymer electrolyte membrane having a first face and a second face, an anode over the first face of the membrane and a cathode over the second face of the membrane, the cathode comprising a first layer and a second layer in intimate contact with each other, wherein the first layer of the cathode is over the first face of the membrane and the second layer of the cathode is over the first layer of the cathode, wherein said first layer comprises a catalyst constructed and arranged for catalyzing an electrochemical reaction of a reactant gas and said second layer comprises a catalyst disposed on a porous support material having a surface area of at least 250 m$^2$/g and constructed and arranged for catalyzing an electrochemical reaction of a reactant gas, and said second layer has a higher porosity than said first layer, the anode being a single layer nanostructured thin film having a thickness ranging from 0.1-1 micron.

2. A membrane electrode assembly set forth in claim 1, wherein single layer nanostructured thin film comprises nanostructured whiskers of organic or inorganic material.

3. A fuel cell as set forth in claim 1, wherein said BET surface area is at least 500 $m^2/g$.

4. A fuel cell as set forth in claim 1, wherein said catalyst is disposed on said porous support and said second layer is a dispersed catalyst layer.

5. A fuel cell as set forth in claim 1, wherein said second layer further comprises an ionomer.

6. A fuel cell as set forth in claim 1, wherein said porous support material comprises at least one of carbon black, Shawinigan black, Ketjen black, graphite, inorganic oxides, oxynitrides, carbon nanotube, inorganic hydroxides, and carbon black surface-modified with an organic hydrophilic group.

7. A membrane electrode assembly as set forth in claim 1, wherein said first layer is an ultra-thin electrode layer having a thickness of about 1 micrometer or less, the first layer comprising nanostructured whiskers of organic or inorganic material.

8. A fuel cell as set forth in claim 1, wherein said first layer comprises a metal catalyst deposited on a plurality of organic support elements.

9. A fuel cell as set forth in claim 8, wherein said metal catalyst comprises at least one of platinum, palladium, iridium, manganese, ruthenium, cobalt, nickel, or iron.

10. A fuel cell as set forth in claim 8, wherein said metal catalyst has a chemical composition represented by the formula: $Pt(M1)_x(M2)_y$, where X and Y are real numbers ranged from 0.01 to 3, M1 and M2 are transitional metal elements selected from the group consisting of Fe, Co, Mn, Ni, Ru, Pd, Ir and Cu.

11. A membrane electrode assembly as set forth in claim 1, wherein said catalyst is present at a greater amount in said first layer than in said second layer.

12. A membrane electrode assembly as set forth in claim 1, wherein said catalyst comprises Pt, and Pt is present at 0.05 $mg/cm^2$ or greater in said first layer, and at about 0.05 $mg/cm^2$ or less in said second layer.

13. A membrane electrode assembly as set forth claim 1, wherein said catalyst comprises Pt, and Pt is present at about 0.1 $mg/cm^2$ or greater in said first layer, and at about 0.05 $mg/cm^2$ or less in said second layer.

14. A membrane electrode assembly as set forth in claim 1, wherein said first layer is an NSTF electrode layer and said second layer is a dispersed catalyst layer, the first layer comprising nanostructured whiskers of organic or inorganic material.

15. A membrane electrode assembly comprising an anode and a cathode, the cathode comprising a first layer and a second layer in intimate contact with each other, wherein both said first layer and second layer comprise a catalyst constructed and arranged for catalyzing an electrochemical reaction of a reactant gas, and said second layer has a higher porosity than said first layer and said second layer comprises a porous support material and metal-containing catalyst disposed on the porous support material having a BET surface area of at least 250 $m^2/g$, the anode comprising a first layer, the first layer of the cathode and the first layer of anode each comprising a nanostructured thin film having a thickness ranging from 0.1-1 micron.

16. A membrane electrode assembly set forth in claim 15, wherein the nanostructured thin film comprises nanostructured whiskers of organic or inorganic material.

17. A membrane electrode assembly set forth in claim 16 wherein the anode further comprises second layer comprise a catalyst constructed and arranged for catalyzing an electrochemical reaction of a reactant gas, and said second layer has a higher porosity than said first layer.

18. A membrane electrode assembly comprising a polymer electrolyte membrane sandwiched between an anode and a cathode; wherein at least one of said anode and cathode comprises a first layer and a second layer, said first layer comprising a metal-containing catalyst disposed on an array of organic support elements, and said second layer comprising a metal-containing catalyst disposed on a porous support material having a surface area of at least 250 $m^2/g$.

19. A membrane electrode assembly as set forth in claim 18, wherein said metal is at least one of platinum, ruthenium, iridium and palladium, and said porous support material comprises at least one of carbon black, Shawinigan black, Ketjen black, graphite, metal oxides, oxynitrides, carbon nanotube, metal hydroxides, and carbon black surface-modified with an organic hydrophilic group.

20. A membrane assembly as set forth in claim 19, wherein said organic element is a whisker having a diameter less than about 0.2 micrometer and a length less than about 6 micrometers, and there are about 1 billion to 10 billions of said whisker per $cm^2$ of said first layer.

21. A process of producing a fuel cell or a membrane electrode assembly comprising: providing a polymer electrolyte membrane, forming a first electrode layer on at least one side of said membrane, where said first electrode layer comprises a catalyst disposed on a plurality of organic support elements; and depositing a seconding electrode layer over said first electrode layer, where said second electrode layer comprises a catalyst disposed on a porous support material having a surface area of at least 250 $m^2/g$.

* * * * *